United States Patent [19]

Kawasaki et al.

[11] 4,092,653

[45] May 30, 1978

[54] MIRROR MOVEMENT DISABLE CIRCUIT FOR LED DISPLAY IN LIGHT FINDER OF SLR CAMERA

[75] Inventors: Masahiro Kawasaki, Tokyo; Eiichi Tano, Asaka; Yoshio Sawada, Tokyo, all of Japan

[73] Assignee: Asahi Kogaku Kogyo Kabushiki Kaisha, Tokyo, Japan

[21] Appl. No.: 735,222

[22] Filed: Oct. 22, 1976

[30] Foreign Application Priority Data

Oct. 25, 1975 Japan .................................. 50-128531

[51] Int. Cl.² .......................... G03B 7/00; G03B 17/20
[52] U.S. Cl. ................................. 354/60 L; 354/23 D; 354/53
[58] Field of Search .................... 354/23 D, 53, 60 E, 354/60 L, 156, 289; 356/218, 226, 227

[56] References Cited

U.S. PATENT DOCUMENTS

| | | | |
|---|---|---|---|
| 3,988,069 | 10/1976 | Kitaura et al. | 354/23 D |
| 3,999,191 | 12/1976 | Saito et al. | 354/23 D |

Primary Examiner—L. T. Hix
Assistant Examiner—William B. Perkey
Attorney, Agent, or Firm—Sughrue, Rothwell, Mion, Zinn and Macpeak

[57] ABSTRACT

A circuit for disabling the LED display L1–L5 in the light meter of a single lens reflex camera in response to mirror movements. When the mirror 21 is raised the switch 17 is closed which reverse biases the LEDs. After the mirror is lowered the switch 17 is opened to enable the LEDs, but a short time delay is provided to allow transients to settle out by reason of a capacitor 18 which must first charge through a grounding resistor 19.

3 Claims, 1 Drawing Figure

U.S. Patent     May 30, 1978     4,092,653
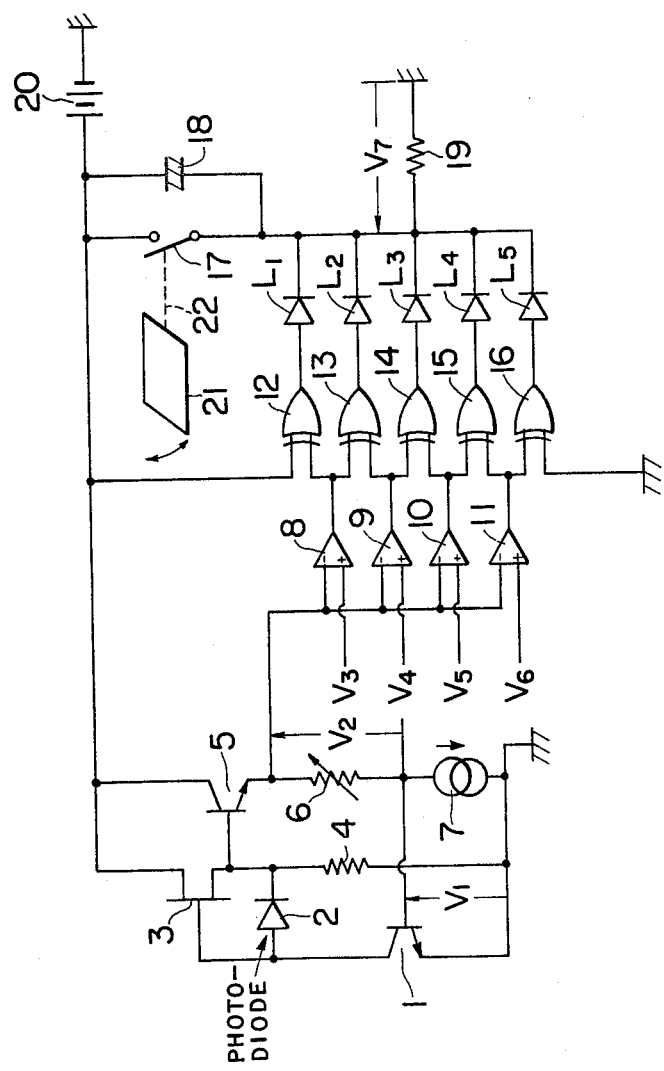

MIRROR MOVEMENT DISABLE CIRCUIT FOR LED DISPLAY IN LIGHT FINDER OF SLR CAMERA

BACKGROUND OF THE INVENTION

This invention relates to a circuit for disabling the LED display indicators in the light finder of a single lens reflex camera in response to the movement of the reflex mirror.

Single lens reflex cameras using LED light finder indicators are commercially available. Such cameras involve a drawback, however, in that the quantity of light incident on the light sensing element varies as the reflex mirror is moved between its upper and lower positions, thus causing fluctuations of the energized LEDs with attendant reading difficulty and unstable operation.

SUMMARY OF THE INVENTION

The present invention eliminates the aforesaid drawback by providing, in an SLR camera, a switch adapted to be transferred from its open position to its closed position prior to the upward movement of the reflex mirror to thereby extinguish any energized LEDs and disable the entire LED array. The switch is reopened after the termination of the downward movement of the mirror, and after a short delay time the LED array is reenabled, thereby eliminating any fluctuations in the indication due to transient effects.

BRIEF DESCRIPTION OF THE DRAWING

In the drawing:

FIG. 1 shows a circuit diagram of a light finder with LED indicators embodying the features of the present invention.

DETAILED DESCRIPTION OF THE PREFERRED EMBODIMENT

FIG. 1 shows a logarithmically compressing transistor 1 whose collector is connected to the gate of a FET 3 which constitutes a self-biasing circuit in combination with a photo-diode 2 and a resistor 4. The source of FET 3 is connected to the base of a transistor 5 whose emitter is driven by a constant current source 7. The emitter potential of transistor 5 is fed back by way of a variable resistor 6, whose resistance is proportional to the difference between the apex value $S_v$ of the film sensitivity and either the apex value $A_v$ of the f-opening or the apex value $T_v$ of the exposure time i.e. (Sv − Av or Tv), to the base of the logarithmically compressing transistor 1.

Comparators 8, 9, 10, and 11, and exclusive OR circuits 12, 13, 14, 15, and 16 constitute, in combination, a parallel comparison type of A/D converter, whose outputs control the LEDs $L_1$, $L_2$, $L_3$, $L_4$ and $L_5$ of the light finder. A switch 17 and a condenser 18 are connected between the current limiting resistor 19 and the positive or anode terminal of a potential source 20. The switch 17 is adapted to be closed prior to the upward movement of the camera reflex mirror 21 by a simple mechanical transfer mechanism, shown schematically at 22.

In operation, feedback is effected from the collector of transistor 1, which is constant current driven by the photo-diode 2, by way of the FET 3 and transistor 5, to the base of transistor 1, whereby a voltage $V_1$ proportional to the apex value Bv of the object brightness is produced across the base and emitter terminals of transistor 1. If the magnitude of the current regulated by the constant current source 7 is set so that the variation per step in the apex value (Sv − Av or Tv) of the voltage $V_2$ across the variable resistor 6 is equal to the variation per step in the apex value of the sensed brightness level Bv, then the emitter potential ($V_1 + V_2$) of transistor 5 will be proportional to the apex value (Bv + Sv − Av or Tv).

The emitter voltage of transistor 5 is fed to the negative input terminals of comparators 8, 9, 10, and 11. Reference voltages $V_3$, $V_4$, $V_5$ and $V_6$ are fed to the positive input terminals of the comparators, with the relative magnitudes of the reference voltages being defined by $V_3 > V_4 > V_5 > V_6$. Assuming that A and B represent the inputs supplied to the exclusive OR circuits and F represents the outputs therefrom, then the output F will be expressed by the logic equation $F = A.\overline{B} + \overline{A}.B$. Thus, the relationship between the input voltages $V_1 + V_2$, the comparator output voltages $V_8$, $V_9$, $V_{10}$ and $V_{11}$, the exclusive OR output voltages $V_{12}$, $V_{13}$, $V_{14}$, $V_{15}$ and $V_{16}$, and the LEDs energized thereby, is as shown in the following table, wherein H represents a high signal or a logical 1 and L represents a low signal or a logical 0.

| input voltage | $V_8$ | $V_9$ | $V_{10}$ | $V_{11}$ | $V_{12}$ | $V_{13}$ | $V_{14}$ | $V_{15}$ | $V_{16}$ | LED |
|---|---|---|---|---|---|---|---|---|---|---|
| $V_1 + V_2 \leqq V_6$ | H | H | H | H | L | L | L | L | H | $L_5$ |
| $V_6 < V_1 + V_2 \leqq V_5$ | H | H | H | L | L | L | L | H | L | $L_4$ |
| $V_5 < V_1 + V_2 \leqq V_4$ | H | H | L | L | L | L | H | L | L | $L_3$ |
| $V_4 < V_1 + V_2 \leqq V_3$ | H | L | L | L | L | H | L | L | L | $L_2$ |
| $V_3 < V_1 + V_2$ | L | L | L | L | H | L | L | L | L | $L_1$ |

If the voltage $V_1 + V_2$, which is proportional to the apex value (Bv + Sv − Av or Tv), is $V_5 < V_1 + V_2 \leqq V_4$, and if the reference voltages $V_5$ and $V_4$ are set to indicate optimum exposure values, then an exposure meter function is implemented by the above-described arrangement.

When the switch 17 is closed prior to the upward move-of the mirror 21, the cathode voltages of the LEDs are raised to the potential level of the voltage source 20, and any energized LED is therefore extinguished. When the switch 17 is returned to its open position following the downward movement of the mirror, the condenser 18 begins to charge through the resistor 19. When the voltage across the condenser reaches a certain level the LEDs are again enabled, and a raised output from any one of the exclusive OR circuits 12–16 will cause the corresponding LED to be lit. The short delay provided by the capacitor 18 allows transients to settle out and avoids any initial fluctuations in the LED display.

As is apparent from the foregoing, the disable circuit of the present invention provides a stable and easy to read indication, with freedom from readng difficulties due to fluctuations in the LEDs caused by the upward and downward movements of the reflex mirror, and further includes delay means for preventing any LED energizations following the downward movement of the mirror until the circuit becomes stabilized.

What is claimed is:

1. In a light meter for a single lens reflex camera including an array of LED display elements, means for energizing an individual one of said elements in accordance with a sensed brightness level and predetermined parameters defining the film sensitivity, the lens aperture opening and the exposure time, and a reflex mirror movable between an upper position and a lower position, the improvement comprising:

switch means adapted to be closed at the commencement of the movement of the mirror from its lower position to its upper position, the closure of said switch means extinguishing any energized LED element and disabling the subsequent energization of any LED elements, and said switch means adapted to be opened at the termination of the movement of the mirror from its upper position to its lower position.

2. A light meter as defined in claim 1 further comprising delay means responsive to the opening of the switch means for enabling the energization of the LED elements after a predetermined time interval.

3. A light meter as defined in claim 2 wherein the cathodes of the LED elements are connected to ground through a common resistor, the switch means comprises a switch connected between the LED element cathodes and the anode of a d.c. power supply, and the delay means comprises a capacitor connected in parallel with the switch, whereby the closing of the switch reverse biases the LED elements and the opening of the switch allows the capacitor to charge through the resistor to thereby forward bias the LED elements.

* * * * *